(12) United States Patent
Horikoshi et al.

(10) Patent No.: US 11,267,729 B2
(45) Date of Patent: Mar. 8, 2022

(54) IN-LIQUID PLASMA GENERATION DEVICE AND LIQUID TREATMENT APPARATUS

(71) Applicant: SCREEN HOLDINGS CO., LTD., Kyoto (JP)

(72) Inventors: Akira Horikoshi, Kyoto (JP); Shohei Nakamura, Kyoto (JP); Shigeru Takatsuji, Kyoto (JP); Motohiro Kono, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 281 days.

(21) Appl. No.: 16/617,455

(22) PCT Filed: May 22, 2018

(86) PCT No.: PCT/JP2018/019694
§ 371 (c)(1),
(2) Date: Nov. 26, 2019

(87) PCT Pub. No.: WO2018/221325
PCT Pub. Date: Dec. 6, 2018

(65) Prior Publication Data
US 2020/0407247 A1      Dec. 31, 2020

(30) Foreign Application Priority Data

May 31, 2017 (JP) .............................. JP2017-108021
May 21, 2018 (JP) .............................. JP2018-097043

(51) Int. Cl.
*C02F 1/46* (2006.01)
*B01J 19/08* (2006.01)

(52) U.S. Cl.
CPC ........... *C02F 1/4608* (2013.01); *B01J 19/087* (2013.01); *B01J 2219/0877* (2013.01); *B01J 2219/0894* (2013.01)

(58) Field of Classification Search
CPC .................. C02F 1/4608; B01J 19/087; B01J 2219/0877; B01J 2219/0894; B01J 2219/0896; B01J 2219/0898
See application file for complete search history.

(56) References Cited

U.S. PATENT DOCUMENTS

| 2004/0050682 A1 | 3/2004 | Paskalov et al. |
| 2014/0168644 A1 | 6/2014 | Kumagai et al. |

(Continued)

FOREIGN PATENT DOCUMENTS

| CN | 103030829 A | 4/2013 |
| CN | 103269559 A | 8/2013 |

(Continued)

OTHER PUBLICATIONS

Chinese Office Action issued in corresponding Chinese Patent Application No. 201880036677.7, dated Apr. 14, 2021.

(Continued)

*Primary Examiner* — Lessanework Seifu
(74) *Attorney, Agent, or Firm* — McDermott Will & Emery LLP (57) ABSTRACT

An in-liquid plasma generation device includes a housing which holds a liquid in an internal space, a gas supply tube which includes an opening in the internal space and discharges a gas into the liquid through the opening, a first electrode which has projecting part projecting into the internal space via the opening from inside of the gas supply tube, the projecting part including a conductor covered by a dielectric, a second electrode which surrounds the projecting part of the first electrode and includes a conductor isolated from the liquid by a dielectric, and a voltage applier which applies a voltage to between the first electrode and the second electrode. A space between the projecting part and (Continued)

the second electrode is a flow passage in which the gas discharged from the opening flows.

13 Claims, 8 Drawing Sheets

(56) References Cited

U.S. PATENT DOCUMENTS

| | | |
|---|---|---|
| 2015/0114913 A1 | 4/2015 | Imai et al. |
| 2015/0136711 A1 | 5/2015 | Fujikane et al. |
| 2015/0352516 A1 | 12/2015 | Imada et al. |

FOREIGN PATENT DOCUMENTS

| | | |
|---|---|---|
| CN | 103782158 A | 5/2014 |
| CN | 103848484 A | 6/2014 |
| CN | 104211137 A | 12/2014 |
| CN | 104556318 A | 4/2015 |
| CN | 104941401 A | 9/2015 |
| CN | 105271475 A | 1/2016 |
| CN | 106277275 A | 1/2017 |
| CN | 106629980 A | 5/2017 |
| JP | 08-266889 A | 10/1996 |
| JP | 2000-228298 A | 8/2000 |
| JP | 2007-207540 A | 8/2007 |
| JP | 2008-178870 A | 8/2008 |
| JP | 2012-011301 A | 1/2012 |
| JP | 2013-206767 A | 10/2013 |
| JP | 2015-116561 A | 6/2015 |
| KR | 2011-0109111 A | 10/2011 |
| KR | 2016-0126696 A | 11/2016 |
| KR | 20160126692 A | 11/2016 |
| WO | 2011/099247 A1 | 8/2011 |

OTHER PUBLICATIONS

Korean Notice of Allowance issued in corresponding Korean Patent Application No. 10-2019-7033718, dated Jul. 10, 2021, with English translation.
International Search Report issued in corresponding International Patent Application No. PCT/JP2018/019694, dated Jul. 24, 2018, with English translation.
Chinese Office Action issued in correspond Chinese Patent Application No. 201880036677.7, dated Dec. 3, 2021.

IN-LIQUID PLASMA GENERATION DEVICE AND LIQUID TREATMENT APPARATUS

CROSS REFERENCE

This application is the U.S. National Phase under 35 US.C. § 371 of International Application No. PCT/JP2018/019694, filed on May 22, 2018, which claims the benefit of Japanese Application No. 2017-108021, filed on May 31, 2017 and Japanese Application No. 2018-097043, filed on May 21, 2018, the entire contents of each are hereby incorporated by reference.

TECHNICAL FIELD

This invention relates to an in-liquid plasma generation device for generating plasma in a liquid by applying an electric field to a gas to be supplied into the liquid and a liquid treatment apparatus using the same.

BACKGROUND ART

Numeral techniques for producing a liquid containing chemically active species have been proposed as means for producing a reaction product or means for detoxifying toxic substances/bacteria. For example, a technique described in PTL 1 produces a bubble in water to be treated flowing in a dielectric tube and applies a high voltage to between electrodes arranged in a liquid, whereby a plasma is generated by causing a discharge in the bubble. Further, in a technique described in PTL 2, one electrode is provided outside a dielectric tube for allowing a liquid mixed with a gas to flow therein and the other electrode is provided in the tube.

CITATION LIST

Patent Literature

[PTL 1] JP 2015-116561A
[PTL 2] JP 2013-206767A

SUMMARY OF INVENTION

Technical Problem

In the above conventional techniques, at least one electrode is in the liquid and a discharge occurs around that electrode. Thus, components of the electrode exposed to generated plasma may be dissolved into the liquid. Further, since a state of the liquid containing the bubble enclosing the electrode changes every second, the density and amount of the generated plasma tend to be unstable. Thus, the above conventional techniques have room for improvement in enhancing plasma generation efficiency for gas and energy to be injected and plasma generation stability.

Solution to Problem

This invention was developed in view of the above problem and aims to provide a technique enabling highly efficient and stable generation of a plasma in an in-liquid plasma generation device for generating plasma in a gas supplied into a liquid.

An in-liquid plasma generation device according to one aspect of this invention includes a housing which holds a liquid in an internal space, a gas supply tube which includes an opening in the internal space and discharges a gas into the liquid through the opening, a first electrode which has projecting part projecting into the internal space via the opening from inside of the gas supply tube, the projecting part including a conductor covered by a dielectric, a second electrode which surrounds the projecting part of the first electrode and includes a conductor isolated from the liquid by a dielectric, and a voltage applier which applies a voltage to between the first electrode and the second electrode, wherein the projecting part and the second electrode form a flow passage in which the gas discharged from the opening flows at a space therebetween.

In the invention thus configured, since the projecting part of the first electrode projects from the opening of the gas supply tube for supplying the gas into the liquid, the gas discharged from the opening flows in such a manner as to enclose the projecting part and is introduced into the liquid. The space between the projecting part of the first electrode and the second electrode provided to surround the projecting part serves as the flow passage of the gas discharged from the opening and a plasma generation field in which a plasma generation electric field is formed by applying a voltage to between the electrodes. Thus, the gas introduced into the liquid passes through the plasma generation field with a fairly high probability.

The conductors of the first electrode and the second electrode are both isolated from the liquid by the dielectrics. Particularly around the projecting part of the first electrode, the gas ejected from the opening forms a bubble for enclosing the projecting part, whereby a layer of the dielectric for covering the conductor is interposed between the conductor of the first electrode and the gas. Accordingly, a discharge caused by applying a voltage is a dielectric barrier discharge. Thus, a stable discharge can be caused in a wider area than in the case of providing the electrodes in contact with the liquid. Further, since the conductors are covered, the dissolution of materials (e.g. metal) of the conductors into the liquid due to exposure to plasma is also prevented.

Advantageous Effects of Invention

As described above, in the invention, the gas discharged from the opening of the gas supply tube opening in the liquid flows in such a manner as to enclose the projecting part of the first electrode and is introduced into the liquid, and the plasma generation field is formed around the projecting part. Thus, highly efficient and stable plasma can be generated in the gas. Further, by supplying the gas plasmatized in this way into the liquid, the liquid richly containing active species produced by plasmatization can be efficiently produced.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EMBODIMENTS

Figure 1:
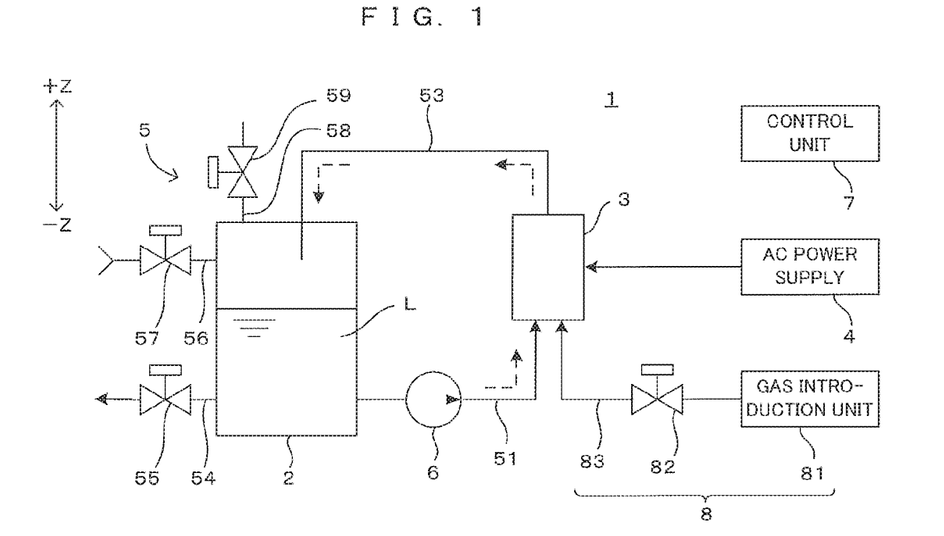
FIG. 1 is a diagram showing a configuration of an example of a liquid treatment apparatus equipped with one embodiment of an in-liquid plasma generation device according to the invention.

FIG. 1 is a diagram showing a configuration of an example of a liquid treatment apparatus equipped with one embodiment of an in-liquid plasma generation device according to the invention. This liquid treatment apparatus 1 is an apparatus for producing a treatment liquid in which active species are dissolved in water stored in a storage tank 2. The liquid treatment apparatus 1 generates in-water plasma (corresponding to an example of "in-liquid plasma" of the invention) in a plasma generator 3 for producing active species. As just described, in this embodiment, water corresponds to an example of a "liquid" of the invention. In each figure described below, a vertically upward direction is expressed as a (+Z) direction and a vertically downward direction is expressed as a (−Z) direction.

The liquid treatment apparatus 1 includes a piping system 5, the plasma generator 3 and a pump 6 disposed in a liquid flow passage formed by the piping system 5. The piping system 5 plays a role in causing the liquid to flow in the apparatus including the supply of the liquid into the storage tank 2 and the delivery of the liquid from the storage tank 2. Specifically, one end of a pipe 51 included in the piping system 5 is connected to a position of a side surface of the storage tank 2 below a liquid surface of a liquid L inside, and the other end of the pipe 51 is connected to a liquid inlet to be described later provided in a lower part of the plasma generator 3. The pump 6 is disposed in the pipe 51. The pump 6 operates in response to an operation command from a control unit 7 for controlling the entire apparatus, whereby the liquid stored in the storage tank 2 is supplied to the plasma generator 3 via the pipe 51.

Although described in detail later, the plasma generator 3 is a device for causing active species to be contained in the liquid by an in-liquid plasma treatment. Specifically, the plasma generator 3 mixes a gas from a gas introduction unit 8 into the liquid being fed via the pipe 51 by the pump 6, generates a plasma in the gas by a high voltage from an alternating current power supply 4 and causes produced active species to be dissolved into the liquid. As just described, the plasma generator 3 receives the liquid supplied from outside as a liquid to be treated and outputs the liquid, in which the active species produced by plasma generation are dissolved into the liquid to be treated, as a treatment liquid.

One end of a pipe 53 is connected to an upper part of the plasma generator 3, and the other end of the pipe 53 is connected to the storage tank 2. Accordingly, the liquid output from the plasma generator 3, i.e. the liquid subjected to the in-liquid plasma treatment in the plasma generator 3, can be returned to the storage tank 2. In the liquid treatment apparatus 1, the liquid stored in the storage tank 2 is circulated by way of the pipes 51, 53 as indicated by broken-line arrows. By generating in-liquid plasma by the plasma generator 3 while circulating the liquid in this way, the concentration of the active species contained in the liquid can be enhanced.

If the liquid containing the active species, i.e. the treatment liquid is produced in this way, the treatment liquid needs to be delivered to outside from the storage tank 2 at a suitable timing. Thus, a pipe 54 is connected to the side surface on a lower part of the storage tank 2. An on-off valve 55 is disposed in this pipe 54. When the on-off valve 55 is opened in response to an open command from the control unit 7, the treatment liquid stored in the storage tank 2 can be taken out to outside. Further, a pipe 56 is connected to the side surface on an upper part of the storage tank 2, and the storage tank 2 is connected to a liquid supply source (not shown) by this pipe 56. An on-off valve 57 is disposed in this pipe 56. When the on-off valve 57 is opened in response to an open command from the control unit 7, the liquid before the treatment, i.e. the liquid containing no active species is replenished into the storage tank 2. Further, a pipe 58 is connected to the ceiling surface of the storage tank 2, and an internal space of the storage tank 2 is connected to a surrounding atmosphere of the liquid treatment apparatus 1 by this pipe 58. An on-off valve 59 is disposed in this pipe 58. If the on-off valve 59 is opened in response to an open command from the control unit 7, a pressure in the storage tank 2 can be returned to an atmospheric pressure by allowing communication between the internal space of the storage tank 2 and the surrounding atmosphere of the liquid treatment apparatus 1. Thus, the on-off valve 59 functions as a so-called leak valve.

A pipe 83 of the gas introduction unit 8 is connected to the plasma generator 3. The gas introduction unit 8 includes a gas supply source 81 for supplying a gas via the pipe 83 and an on-off valve 82 disposed at an intermediate position of the pipe 83. The on-off valve 82 is opened and closed in response to open and close commands from the control unit 7, whereby the amount of the gas introduced and supplied to the plasma generator 3 is temporally changed. Specifically, when the on-off valve 82 is opened in response to an open command from the control unit 7, the gas is fed under pressure from the gas supply source 81 via the on-off valve 82 and the pipe 83 and supplied to the plasma generator 3 during the opening.

Figure 2:
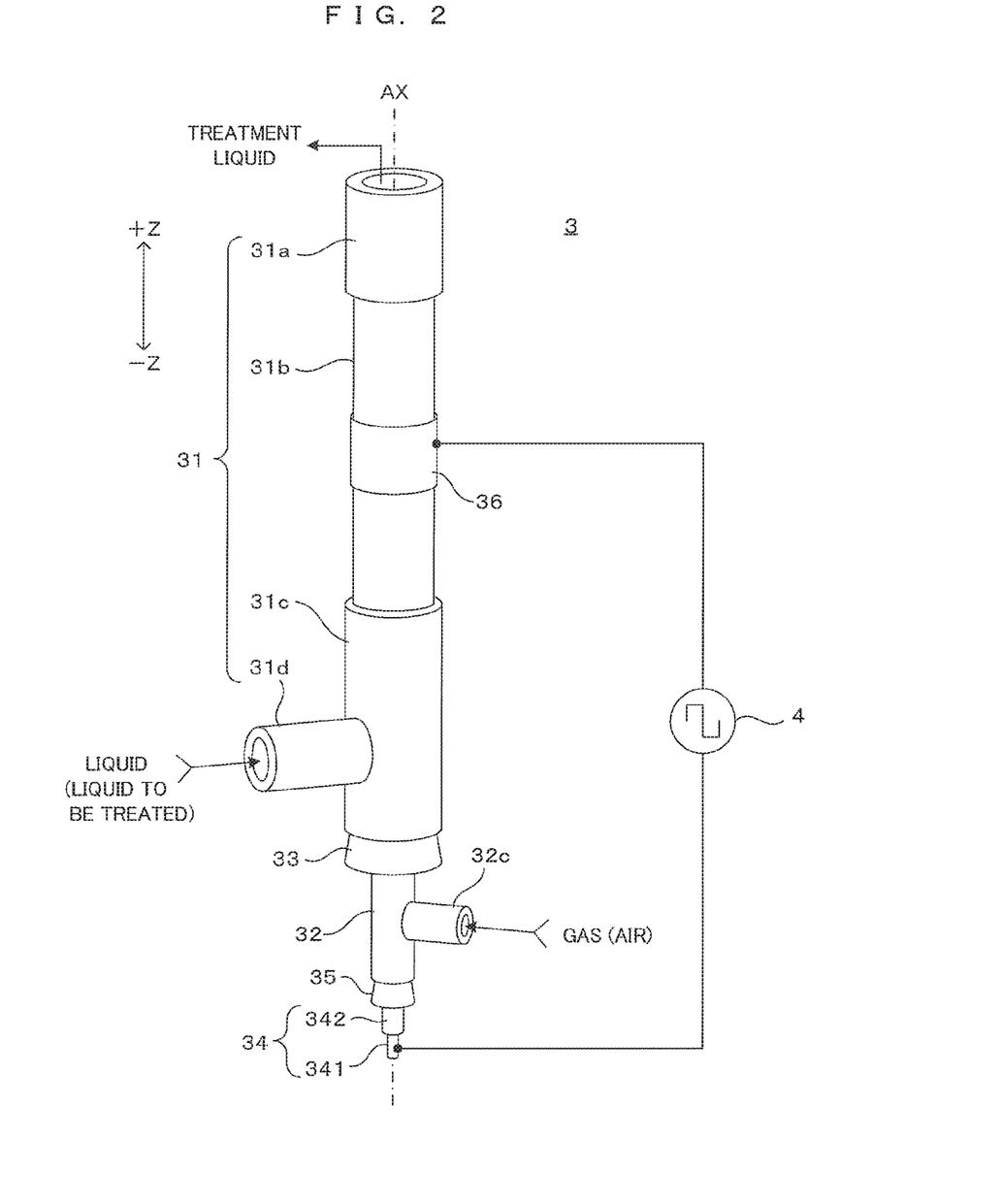
FIG. 2 is a diagram showing the external appearance of the plasma generator.
Figure 3:
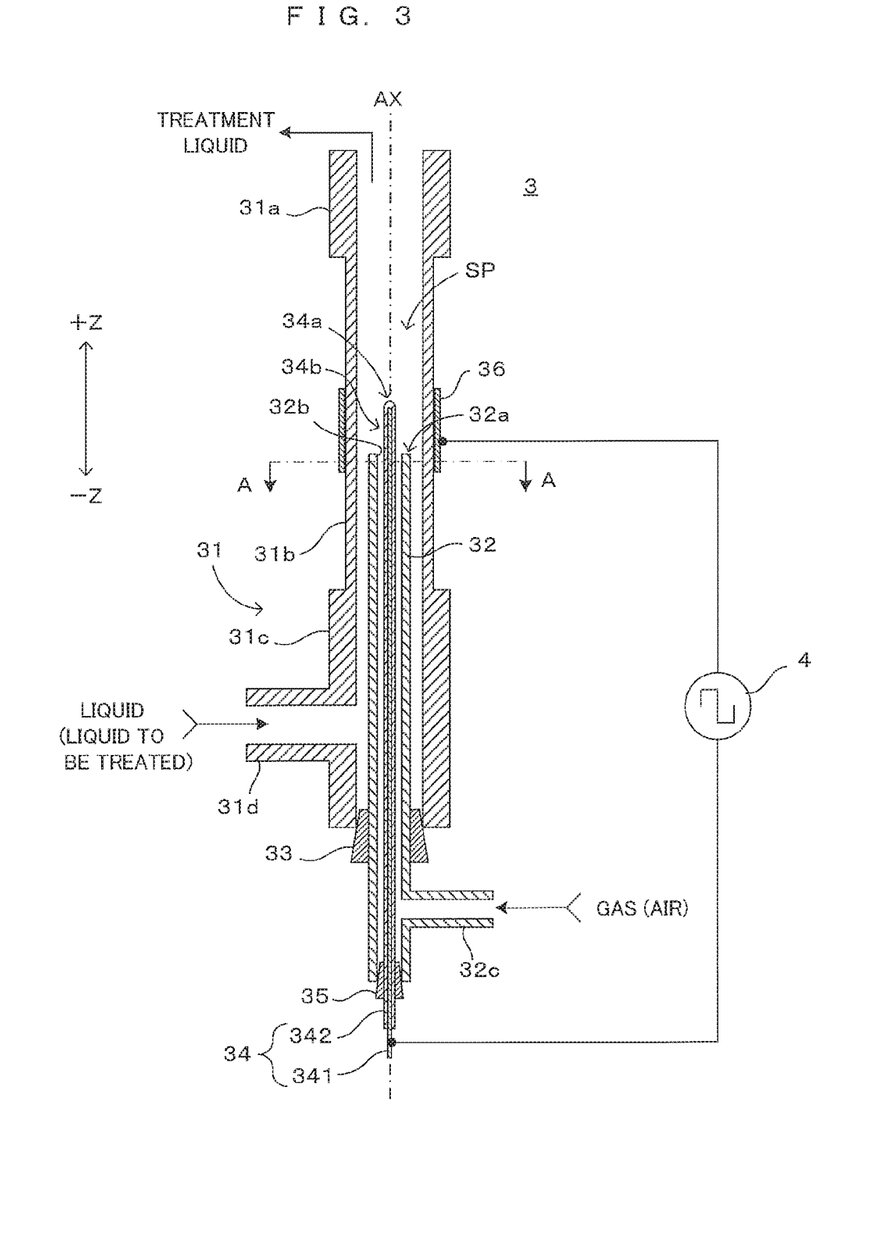
FIG. 3 is a sectional view showing an internal structure of the plasma generator.

FIG. 2 is a diagram showing the external appearance of the plasma generator. FIG. 3 is a sectional view showing an internal structure of the plasma generator. As shown in FIG. 2, the plasma generator 3 includes a cylindrical housing 31 extending in a vertical direction (Z direction) as a main component. FIG. 3 shows a cross-section in a vertical plane including a cylinder axis AX of the housing 31.

The housing 31 is a cylindrical tube, for example, made of quartz glass and hollow inside and structured such that thick portions 31a, 31c having a larger tube thickness are connected on both sides of a thin portion 31b formed to have a relatively thin tube wall. For example, the housing 31 can be fabricated by joining thick tubes having the same inner diameter to both ends of a thin tube by welding. Alternatively, a side wall surface of a thick tube may be partially cut, ground or extended to be thinned.

Although not shown, the upper end of the upper thick portion 31a is connected to the pipe 53. Further, a liquid introduction tube 31d for receiving the liquid supplied from the storage tank 2 as the liquid to be treated is joined to the side surface of the lower thick portion 31c. The pipe 51 is connected to this liquid introduction tube 31d. Thus, in an internal space SP of the housing 31, the liquid introduced as the liquid to be treated from a lower part flows upward and is delivered as the treatment liquid from an upper end part.

An inner tube 32 extending in the vertical direction is inserted into the internal space SP of the housing 31. The inner tube 32 is a tube, for example, made of quartz glass and having an outer diameter smaller than the inner diameter of the housing 31. An inner tube 32 is supported substantially coaxially with the cylinder axis AX of the housing 31 by a sealing plug 33, for example, made of an elastic material such as silicon rubber. The sealing plug 33 also functions as a seal for preventing the outflow of the liquid by separating the internal space SP and an external space. In the internal space SP of the housing 31, the inner tube 32 extends to a position above a position where the liquid is introduced from the liquid introduction tube 31d. An upper end 32a of the inner tube 32 is, for example, located substantially in a vertically central part of the thin portion 31b of the housing 31. The upper end 32a of the inner tube 32 communicates with the internal space SP of the housing 31. Specifically, the upper end 32a of the inner tube 32 includes an opening 32b open upward.

On the other hand, a lower end of the inner tube 32 projects downward to the outside of the housing 31 via the sealing plug 33, and a gas introduction tube 32c is connected to the side surface thereof. Although not shown, the gas introduction tube 32b is connected to the pipe 83 of the gas introduction unit 8. The gas supplied from the gas introduction unit 8 is introduced into the liquid flowing upward in the internal space SP of the housing 31 through the opening 32b by way of the insides of the gas introduction tube 32c and the inner tube 32. Thus, the introduced gas becomes a bubble in the liquid and moves upward in the internal space SP.

A first electrode 34 extending in the vertical direction is inserted into the inner tube 32. The first electrode 34 is structured such that a surface of a rod-like conductor 341 having a substantially circular cross-section is covered by a surface layer 342 made of a dielectric such as quartz glass. The surface layer 342 may be formed by coating a dielectric material to the surface of the conductor 341. Further, the first electrode 34 may be structured such that the conductor 341 is inserted into a tube made of a dielectric material and having a sealed upper end part. The first electrode 34 is supported substantially coaxially with the inner tube 32 by a sealing plug 35, for example, made of an elastic material such as silicon rubber. A lower end of the first electrode 34 is partially exposed without being covered by the surface layer 342, and the alternative current power supply 4 is electrically connected to this part.

An upper end 34a of the first electrode 34 extends further upward than the upper end 32a of the inner tube 32. Thus, a tip part of the first electrode 34 projects upward from the opening 32b of the inner tube 32. A part of the first electrode 34 projecting upward from the upper end 32a of the inner tube 32 in this way is referred to as a "projecting part" and denoted by reference sign 34b below.

Figure 4:
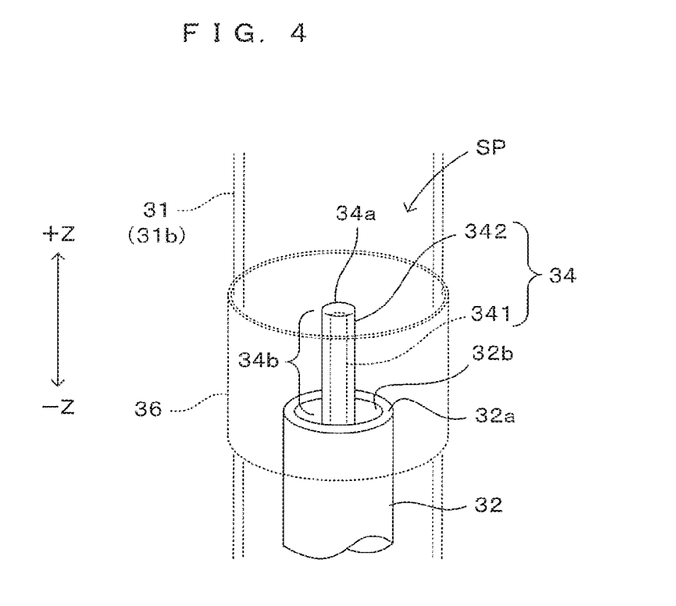
FIG. 4 is an enlarged view showing a structure around the projecting part in more detail.

FIG. 4 is an enlarged view showing a structure around the projecting part in more detail. As shown in FIGS. 3 and 4, a second electrode 36 is provided to laterally (horizontally) surround the projecting part 34b of the first electrode 34. Specifically, the second electrode 36 made of an annular metal plate is arranged to surround the thin portion 31b of the housing 31 at a position corresponding to the projecting part 34b in the vertical direction. The position of the second electrode 36 in the vertical direction is so set as to be at least partially overlap the projecting part 34b in a side view. The second electrode 36 is isolated from the liquid in the internal space SP by a layer of quartz glass, which is a dielectric forming the tube wall of the thin portion 31b.

Figure 5:
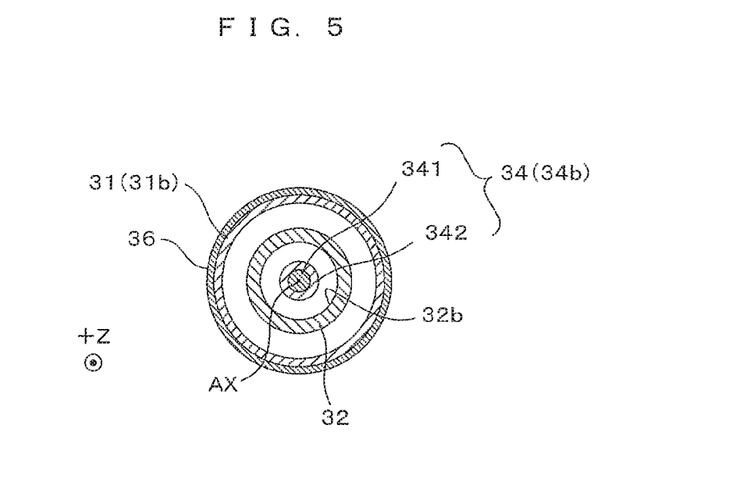
FIG. 5 is a horizontal sectional view of the plasma generator.

FIG. 5 is a horizontal sectional view, specifically a sectional view along line A-A of FIG. 3, of the plasma generator. As shown in FIG. 5, the conductor 341 of the first electrode 34, the surface layer 342, the inner tube 32, the thin portion 31b of the housing 31 and the second electrode 36 are arranged substantially coaxially with one another near the projecting part 34b.

An outer diameter of the first electrode 34 is smaller than an inner diameter of the inner tube 32. Thus, the first electrode 34 is included inside the opening 32b of the inner tube 32 in a plan view shown in FIG. 5. Therefore, a space between the outer side surface of the first electrode 34 and the inner side surface of the inner tube 32 serves as a flow passage for the gas. The gas flowing in this flow passage flows into the internal space SP of the housing 31 from the opening 32b through a space surrounding the first electrode 34. The outer diameter of the inner tube 32 is smaller than the inner diameter of the housing 31. Thus, a space between the outer side surface of the inner tube 32 and the inner side surface of the housing 31 serves as a flow passage for the liquid.

An alternating current high voltage is applied to between the first and second electrodes 34, 36 from the alternating current power supply 4. In this way, a strong alternating current electric field is formed in a space around the first electrode 34, particularly around the projecting part 34b. Since the annular second electrode 36 is arranged substantially coaxially to surround the rod-like conductor 341 of the first electrode 34, a particularly strong electric field substantially uniform in a circumferential direction is formed near the first electrode 34 between the first and second electrodes 34, 36. Specifically, in this plasma generator 3, a locally strong plasma generation field can be formed by concentrating the electric field around the projecting part 34b of the first electrode 34.

Further, as shown in FIG. 3, a length of the second electrode 36 in the vertical direction is larger than a length of the projecting part 34b. An upper end part of the second electrode 36 extends further upward than an upper end part of the projecting part 34b and a lower end part thereof extends further downward than a lower end part of the projecting part 34b. By such a configuration, an electric field substantially uniform also in a height direction is formed around the projecting part 34b.

Figure 6:
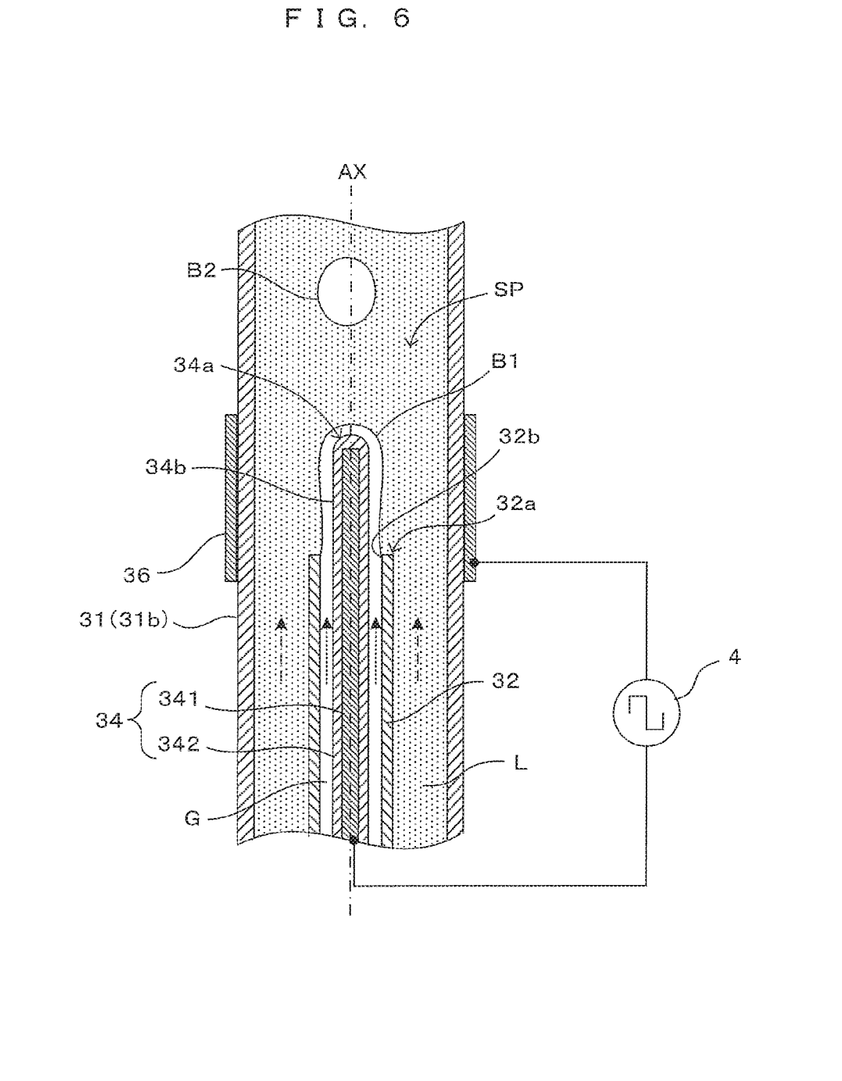
FIG. 6 is a diagram showing the principle of plasma generation in this embodiment.

FIG. 6 is a diagram showing the principle of plasma generation in this embodiment. The internal space SP inside the housing 31 is filled with the liquid L supplied from the storage tank 2. As indicated by broken-line arrows, the liquid L flows upward in the space between the inner wall of the housing 31 and the outer wall of the inner tube 32. On the other hand, a gas G supplied from the gas introduction unit 8 and flowing inside the inner tube 32 flows upward around the first electrode 34 as indicated by dotted-line arrows, becomes bubbles and is introduced into the liquid through the opening 32b. At this time, if a flow rate of the gas G is appropriately set, such a bubble B1 as to enclose the projecting part 34b of the first electrode 34 can be formed by the action of the surface tension of the liquid L.

Since the particularly strong electric field is formed around the projecting part 34b as described above, plasma due to a discharge is generated in the bubble B1. Since the conductor 341 of the first electrode 34 is covered by the dielectric surface layer 342, the discharge at this time is a dielectric barrier discharge. Further, the electric field substantially uniform in an axial direction and a radial direction is formed around the projecting part 34b. From these, a uniform plasma can be stably generated in a wide area in the bubble B1 enclosing the projecting part 34b.

By further supplying the gas G via the inner tube 32, the bubble B1 is released into the liquid from the projecting part 34b. Highly concentrated active species produced by the plasma are contained in a released bubble B2. These active species are dissolved into the liquid, whereby the liquid L comes to contain the active species. By refluxing the liquid L containing the active species to the storage tank 2 via the pipe 53, the concentration of the active species in the liquid in the storage tank 2 increases. By circulating the liquid by the piping system 5, the concentration of the active species in the liquid can be further enhanced.

The conductors of the first and second electrodes 34, 36 are both not in contact with the liquid L. This can set a mode of the caused discharge at a dielectric barrier discharge mode, and stable plasma can be generated in a wide area. Further, the dissolution of a conductive material into the liquid due to the exposure of the conductors to the plasma is also prevented. As just described, the liquid treatment apparatus 1 of this embodiment can produce a liquid richly containing the active species and no mixed impurities as a treatment liquid.

Figure 7:
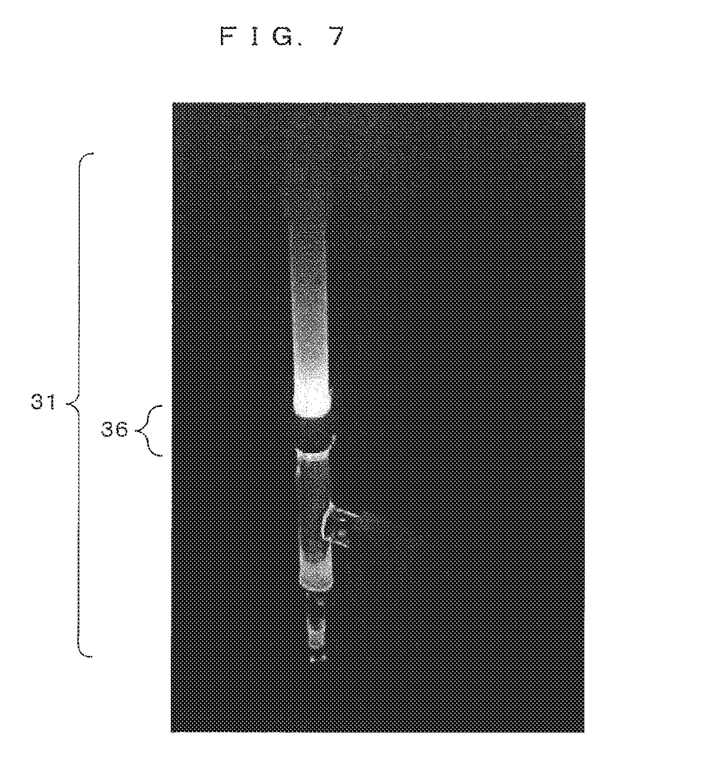
FIG. 7 is a diagram showing a picture when a plasma was generated by the plasma generator.

FIG. 7 is a diagram showing a picture when a plasma was generated by the plasma generator. A bright part extending in the vertical direction in the picture is the housing 31, and a dark part appearing in a central part of the housing 31 is the second electrode 36. A part of the inside of the housing 31 surrounded by the second electrode 36 is particularly brightly lighted and it is found that high-density plasma is generated in this part.

Next, why the housing 31 is configured by connecting the thick portions 31a, 31c and the thin portion 31b is described. First, it is desirable to configure the entire housing 31 by a tube having a constant thickness if the strength of the entire housing 31 and ease of manufacturing are considered. Particularly, the upper end part to which the external pipe 53 is connected and the part to which the liquid introduction tube 31d is joined need to have a sufficient thickness. On the other hand, from the perspective of obtaining a high electric field strength around the projecting part 34b of the first electrode 34, the quartz glass, which is a dielectric and constitutes the tube wall, is better to be as thin as possible. Accordingly, in the housing 31 of this embodiment, the above request is satisfied by forming the both ends by the thick portions 31a, 31c and forming a central part, where the plasma generation field is formed, by the thin portion 31b.

The same request to thin a layer of a dielectric between electrodes applies also to the first electrode 34. Specifically, out of the first electrode 34, the surface layer 342 made of the dielectric is preferably as thin as possible to such an extent as not to impair mechanical strength.

This is particularly important if the gas G is a type of gas that hardly generates plasma. The inventors of this application conducted various experiments using water (pure water) as the liquid L and a quartz tube having an outer diameter of about 10 mm as the housing 31. According to the result of the experiments, when a tube wall was 1 mm, plasma was relatively easily generated if the gas G was argon, but no plasma was generated in the case of using air as the gas G. In the case of using the air, no plasma was generated unless the tube wall was set at 0.5 mm or less. There is a similar tendency for the surface layer 342 of the first electrode 34. Accordingly, a thickness of the tube wall in the thin portion 31b of the housing 31 was set at 0.4 mm and a thickness of the surface layer 342 of the first electrode 34 was set at 0.3 mm. By setting in this way, high-density plasma could be stably generated even in the case of using the air as the gas G.

If a treatment liquid containing active species is utilized in an atmosphere, such as for sterilization or to promote the growth of plants, it has a great merit that air (atmospheric air) is usable as a gas for plasma generation. Specifically, since the treatment liquid can be produced using virtually inexhaustible atmospheric air present in an operating environment of the apparatus, a special gas supply source is not necessary. The gas supply source 81 of the liquid treatment apparatus 1 only has to include, for example, a compressor for taking in, pressurizing and delivering atmospheric air around. This is advantageous in simplifying an apparatus configuration and reducing the size of the apparatus and, of course, can reduce treatment cost.

Even in the case of using a type of gas, which relatively easily generates plasma, such as helium or argon as the gas G, an effect of thinning the tube wall is large. Specifically, plasma density increases by thinning the tube wall and enhancing electric field strength. Thus, usage efficiency of the introduced gas is enhanced and more active species can be produced if the same amount of the gas is used. As a result, a treatment liquid highly effective in sterilization can be produced. Further, since a necessary amount of the gas can be suppressed to obtain the same plasma density, treatment cost can be reduced. Further, time and energy consumption required to produce a treatment liquid containing a necessary concentration of active species can be reduced.

Figure 8:
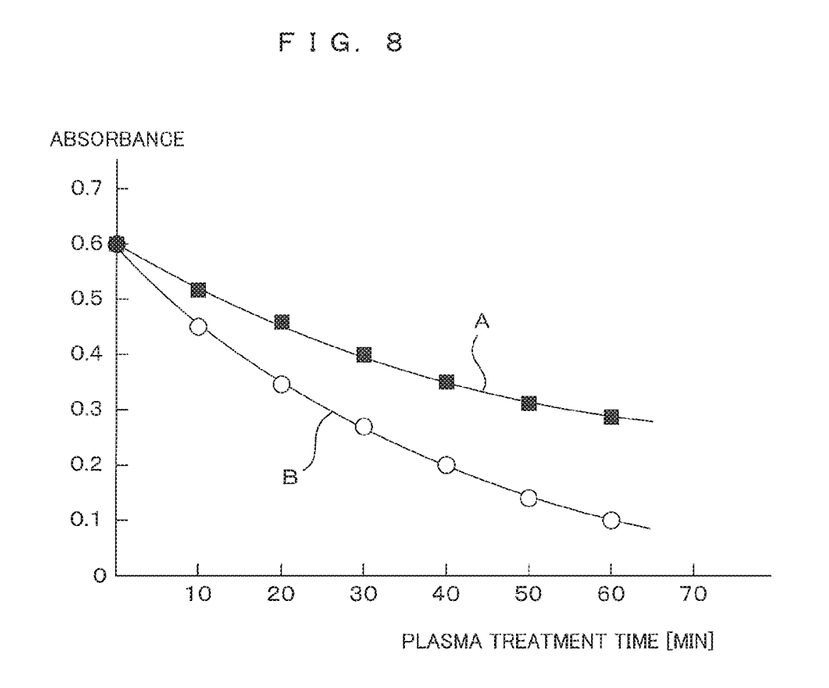
FIG. 8 is a graph showing an example of an experimental result for comparing amounts of plasma active species.

FIG. 8 is a graph showing an example of an experimental result for comparing amounts of plasma active species. The inventors of this application conducted an experiment by injecting water added with indigo carmine into the plasma generator 3 and checking how a liquid color changed with the passage of a treatment time. Since indigo carmine is decolorized by reacting with the active species, the liquid color was evaluated by absorbance. A curve A represents a result when the thickness of the tube wall of the housing 31 was 1 mm and that of the surface layer 342 of the first electrode 34 was 0.7 mm. On the other hand, a curve B represents a result when the housing 31 was provided with the thin portion 31b having a tube wall of 0.4 mm and the thickness of the surface layer 342 of the first electrode 34 was set at 0.3 mm. As is clear from FIG. 8, it is found that absorbance decreases in a shorter time and more active species are produced in the treatment liquid by thinning the tube wall.

As described above, in the above embodiment, the plasma generator 3 functions as an "in-liquid plasma generation device" of the invention. Further, the housing 31, the first electrode 34 and the second electrode 36 respectively correspond to a "housing", a "first electrode" and a "second electrode" of the invention. The inner tube 32 functions as a "gas supply tube" of the invention, and the alternating current power supply 4 functions as a "voltage applier" of the invention.

Further, in the housing 31, the opening of the liquid introduction tube 31d connected to the pipe 51 corresponds to an "inlet" of the invention. Further, the opening in the upper end part of the housing 31 connected to the pipe 53 corresponds to an "outlet" of the invention. Further, in the liquid treatment apparatus 1 of the above embodiment, the storage tank 2 functions as a "reservoir" of the invention, and the pump 6 functions as a "liquid supplier" of the invention.

Note that the invention is not limited to the above embodiment and various changes other than those described above can be made without departing from the gist of the invention. For example, although a case where the projecting part 34b of the first electrode 34 is completely enclosed by the bubble B1 is assumed in the above embodiment, there is no limitation to this. For example, conditions may be such that many fine bubbles are produced to enclose the projecting part 34b. By the presence of many bubbles around the projecting part 34b where a high electric field is formed, a plasma generation probability in each bubble can be increased and plasma can be efficiently generated.

Further, although the annular second electrode 36 covering the outer peripheral surface of the thin portion 31b of the housing 31 is provided in the above embodiment, the second electrode 36 may be, for example, structured as follows besides having the above structure.

Figure 9A:
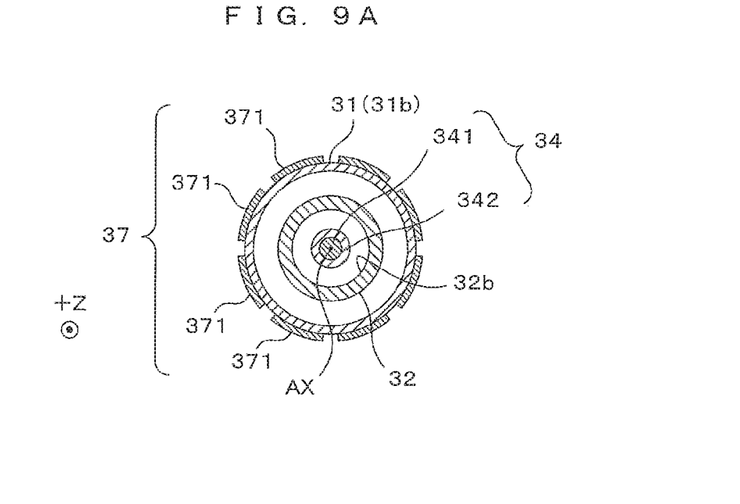
FIG. 9A is a diagram showing modifications of the second electrode.

FIGS. 9A and 9B are diagrams showing modifications of the second electrode. A second electrode 37 shown in FIG. 9A is constituted by a plurality of electrode pieces 371 divided in the circumferential direction. Also by such a structure, an electric field substantially uniform in the circumferential direction can be generated around the projecting part 34b of the first electrode 34.

Figure 9B:
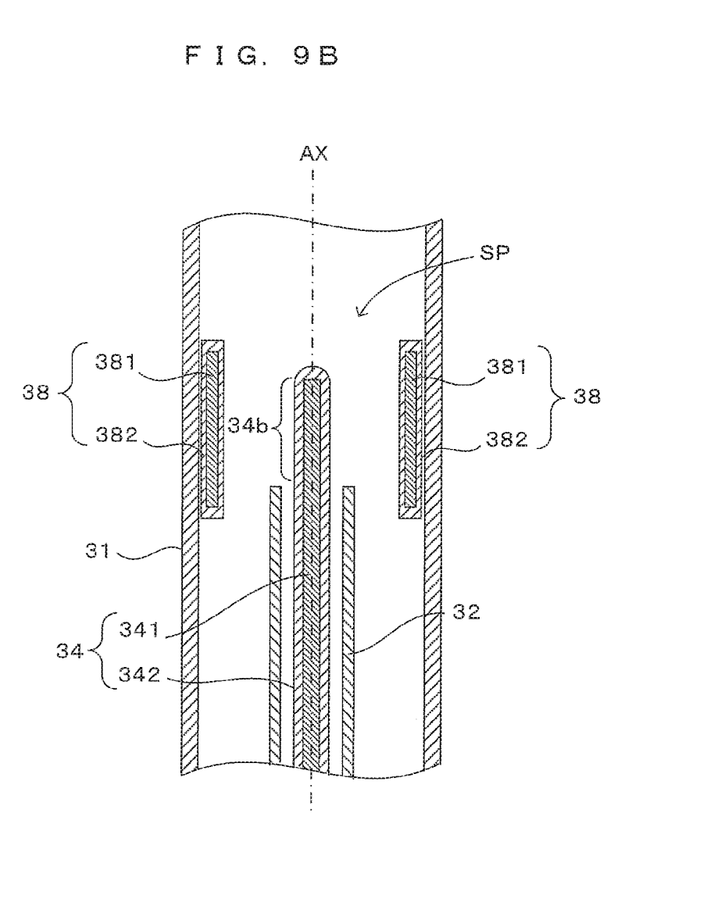
FIG. 9B is a diagram showing modifications of the second electrode.

Further, a second electrode 38 shown in FIG. 9B has such a structure that a conductor 381 is covered with a surface layer 382 made of a dielectric (e.g. quartz glass) and arranged in the internal space SP in the housing 31. Also by such a structure, an electric field substantially uniform in the circumferential direction can be generated around the projecting part 34b of the first electrode 34. Further, since an inter-electrode distance can be reduced as compared to the case where the second electrode is provided outside the housing, electric field strength can be enhanced or an applied voltage can be reduced. Besides, a structure in which the second electrode is embedded in the housing may be, for example, employed.

Further, although the housing 31 and the surface layer 342 of the first electrode 34 in the above embodiment are made of quartz glass, the quartz glass is used as an example of the dielectric. A dielectric material other than this may be used if this material is resistant to used liquid and plasma and does not cause the dissolution of impurities into the liquid. For example, it is not practically essential that the tube wall is transparent, and an opaque material can also be used.

Further, the thick portions and the thin portion of the housing 31 may be made of different materials. Further, the entire tube may be thinned and reinforced with other mechanical means. Further, the entire tube wall may be thick as long as electric field strength sufficient to generate plasma can be obtained around the projecting part of the first electrode.

Further, in the first electrode 34 of the above embodiment, the conductor 341 in the housing 31 is entirely covered with the surface layer 342. However, a part where a distance to the second electrode 36 is large enough not to cause a discharge and which has no possibility of contacting the liquid in the inner tube 32 needs not necessarily covered.

Further, although the housing 31, the inner tube 32 and the first electrode 34 are arranged coaxially with one another in the above embodiment, these need not be strictly coaxial. Specifically, it is sufficient for the gas flowing in the inner tube 32 to be introduced into the liquid to enclose the first electrode 34. To that end, for example, the projecting part 34b of the first electrode 34 only has to be located in the opening 32b of the inner tube 32 in a side view. As long as this is satisfied, the inner tube 32 and the first electrode 34 need not necessarily coaxial. Specifically, the first electrode 34 needs not be strictly arranged in a center of the inner tube 32. Further, the housing 31 and the inner tube 32 also need not necessarily be coaxial as long as the liquid smoothly flows in the space therebetween. Further, cross-sectional shapes of these elements need not necessarily be similar to each other and can be appropriately modified.

Further, in the above embodiment, the sealing plugs made of the elastic material are used in mounting the inner tube 32 into the housing 31 and mounting the first electrode 34 into the inner tube 32. Thus, the plasma generator 3 can be easily disassembled. However, instead of this, the members may be permanently fixed, for example, by adhesion or welding.

Further, in the plasma generator 3 of the above embodiment, the housing 31 also functions as a part of the pipe for allowing the liquid to flow. However, the "housing" in the invention is not limited to such a configuration and may function, for example, as a container for storing the liquid in an internal space.

Further, although the plasma generator 3 has a cylindrical shape having the cylinder axis AX substantially in the vertical direction in the above embodiment, there is no limitation to this. For example, even in the case of arranging the plasma generator 3 having the structure of FIG. 2 such that the cylinder axis AX is horizontal, plasma can be satisfactorily generated. If the liquid and the gas in the plasma generator are fed under pressure, a bubble formed by the gas discharged from the opening of the inner tube mainly extends in a direction along a discharging direction of the gas and a pressure-feeding direction of the surrounding liquid. Thus, effects similar to the above are obtained if the bubble extending direction and an extending direction of the projecting part of the first electrode are substantially the same.

The above embodiment is structured such the inner tube 32 extends in the vertical direction, the gas is discharged from the upward facing opening 32b provided in the upper end 32a of the inner tube 32 and the first electrode 34 projects upward from the opening 32b. Thus, the extending direction of the projecting part 34b matches not only flowing directions of the liquid L and the gas G, but also a direction of buoyancy acting on the gas G in the liquid L. Therefore, a probability of generating a bubble to enclose the projecting part 34b can be increased. In this way, a plasma generation area in the liquid can be expanded and plasma can be more efficiently generated.

Further, the above embodiment relates to a "liquid treatment apparatus" in which the plasma generator, which is the "in-liquid plasma generation device" according to the invention, is provided in the flow passage of the circulating liquid. However, the in-liquid plasma generation device of the invention itself has a function of producing a treatment liquid by dissolving active species into the liquid, and an application range thereof is not limited to those having such a circulation path. For example, the treated liquid output from the upper part of the plasma generator 3 may be directly taken out to outside and used as the treatment liquid. Further, the liquid and the gas used are arbitrary without being limited to the above ones.

As the specific embodiment has been illustrated and described above, the in-liquid plasma generation device according to the invention may be configured such that an opening is open upward, a projecting part projects upward from the opening and a conductor of a second electrode laterally surrounds the projecting part. According to such a configuration, a gas discharged from the opening flows upward in a liquid. Thus, a probability of generating plasma can be increased by allowing more gas to pass through a space surrounding the upward extending projecting part.

Further, for example, the projecting part may be located inside the opening and the second electrode may surround the opening in a plan view. Further, in a side view, the projecting part and the second electrode may at least partially overlap each other. According to such a configuration, most of the gas discharged from the opening passes through the space around the projecting part having a plasma generation field formed therearound and is introduced into the liquid. Thus, plasma generation efficiency can be enhanced.

Further, the first electrode may be a rod-like body extending along a cylinder axis of a gas supply tube and a space between a side surface of the rod-like body and an inner side surface of the gas supply tube may serve as a flow passage of the gas. According to such a configuration, the gas smoothly flows through the flow passage having an annular cross-section and the first electrode is surrounded by this flow passage. Thus, a bubble can be stably formed around the projecting part.

Further, the housing may include a cylindrical body made of a dielectric, the gas supply tube is provided coaxially with the cylindrical body inside the cylindrical body, and the liquid is held in a space between an inner side surface of the cylindrical body and the gas supply tube. According to such a configuration, all the gas supplied from the gas supply tube contacts the surrounding liquid. In this way, active species produced by plasma generation in the gas can be efficiently dissolved into the liquid.

Further, the housing may include a cylindrical body made of a dielectric and the second electrode may be provided on an outer peripheral surface of the cylindrical body. According to such a configuration, the second electrode can be isolated from the liquid in the housing by a wall surface of the housing. As a result, the contact of the second electrode with the liquid can be avoided.

Further, the conductor of the second electrode may be an annular conductor surrounding the outer peripheral surface of the cylindrical body. According to such a configuration, an electric field substantially uniform in a circumferential direction in a plan view can be generated around the first electrode. As a result, uniform plasma can be generated around the first electrode.

Further, the first electrode, the gas supply tube, the cylindrical body and the second electrode may be provided coaxially with a vertical axis. According to such a configuration, the flow passage of the gas between the first electrode and the gas supply tube and the flow passage of the liquid between the gas supply tube and the cylindrical body have a constant cross-sectional shape in the vertical direction respectively. Thus, the gas and the liquid can smoothly flow in the respective flow passages. In this way, the flows of the liquid and the gas around the projecting part of the first electrode can be stabilized and plasma generation in this area can be stabilized. Further, by coaxially arranging the first electrode and the second electrode, an electric field formed around the first electrode can be made uniform.

Further, the housing may be provided, below the projecting part, with an inlet for introducing the liquid into an internal space and provided, above the projecting part, with an outlet for delivering the liquid to outside. According to such a configuration, the liquid flows upward in the housing, and the bubble containing plasma active species and ascending in the liquid and the liquid can be in contact for a long time. Thus, the active species can be efficiently incorporated into the liquid.

Further, in the liquid treatment apparatus according to the invention, the liquid supplier may be, for example, configured to supply the liquid stored in a reservoir to the inlet. According to such a configuration, the liquid passing through the in-liquid plasma generation device is circulated, whereby the concentration of active species in the liquid can be enhanced.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

INDUSTRIAL APPLICABILITY

This invention can be applied to an in-liquid plasma generation technique and techniques in general for producing a treatment liquid containing active species using the former technique.

REFERENCE SIGNS LIST 1 liquid treatment apparatus
2 storage tank (reservoir)
3 plasma generator (in-liquid plasma generation device)
4 AC power supply (voltage applier)
6 pump (liquid supplier)
31 housing
32 inner tube (gas supply tube)
32b opening
34 first electrode
34b projecting part
36 second electrode
341 conductor
342 surface layer
G gas
L liquid

The invention claimed is:

1. An in-liquid plasma generation device, comprising:
a housing which holds a liquid in an internal space;
a gas supply tube which includes an opening in the internal space and discharges a gas into the liquid through the opening;
a first electrode which has projecting part projecting into the internal space via the opening from inside of the gas supply tube, the projecting part including a conductor covered by a dielectric;
a second electrode which surrounds the projecting part of the first electrode and includes a conductor isolated from the liquid by a dielectric; and
a voltage applier which applies a voltage to between the first electrode and the second electrode, wherein
the projecting part and the second electrode form a flow passage in which the gas discharged from the opening flows at a space therebetween.

2. The in-liquid plasma generation device according to claim 1, wherein the opening is open upward, the projecting part projects upward from the opening and the conductor of the second electrode laterally surrounds the projecting part.

3. The in-liquid plasma generation device according to claim 2, wherein in a plan view, the projecting part is located inside the opening and the second electrode surrounds the opening.

4. The in-liquid plasma generation device according to claim 1, wherein in a side view, the projecting part and the second electrode at least partially overlap each other.

5. The in-liquid plasma generation device according to claim 1, wherein the first electrode includes a rod-like body extending along a cylinder axis of the gas supply tube and a space between a side surface of the rod-like body and an inner side surface of the gas supply tube serves as the flow passage of the gas.

6. The in-liquid plasma generation device according to claim 1, wherein
the housing includes a cylindrical body made of a dielectric, the gas supply tube is provided coaxially with the cylindrical body inside the cylindrical body, and the liquid is held in a space between an inner side surface of the cylindrical body and the gas supply tube.

7. The in-liquid plasma generation device according to claim 1, wherein the housing includes a cylindrical body made of a dielectric and the second electrode is provided on an outer peripheral surface of the cylindrical body.

8. The in-liquid plasma generation device according to claim 6, wherein the conductor of the second electrode is an annular conductor surrounding the outer peripheral surface of the cylindrical body.

9. The in-liquid plasma generation device according to claim 7, wherein the conductor of the second electrode is an annular conductor surrounding the outer peripheral surface of the cylindrical body.

10. The in-liquid plasma generation device according to claim 1, wherein the first electrode, the gas supply tube, the cylindrical body and the second electrode are arranged coaxially with a vertical axis.

11. The in-liquid plasma generation device according to claim 1, wherein the housing includes:
an inlet for introducing the liquid into the internal space below the projecting part; and
an outlet for delivering the liquid to outside above the projecting part.

12. A liquid treatment apparatus for generating a treatment liquid containing an active species, comprising:
the in-liquid plasma generation device according to claim 11;
a liquid supplier which supplies the liquid to the inlet; and
a reservoir which stores the liquid delivered from the outlet.

13. The liquid treatment apparatus according to claim 12, wherein the liquid supplier supplies the liquid stored in the reservoir to the inlet.

* * * * *